United States Patent Office 3,002,417
Patented Oct. 3, 1961

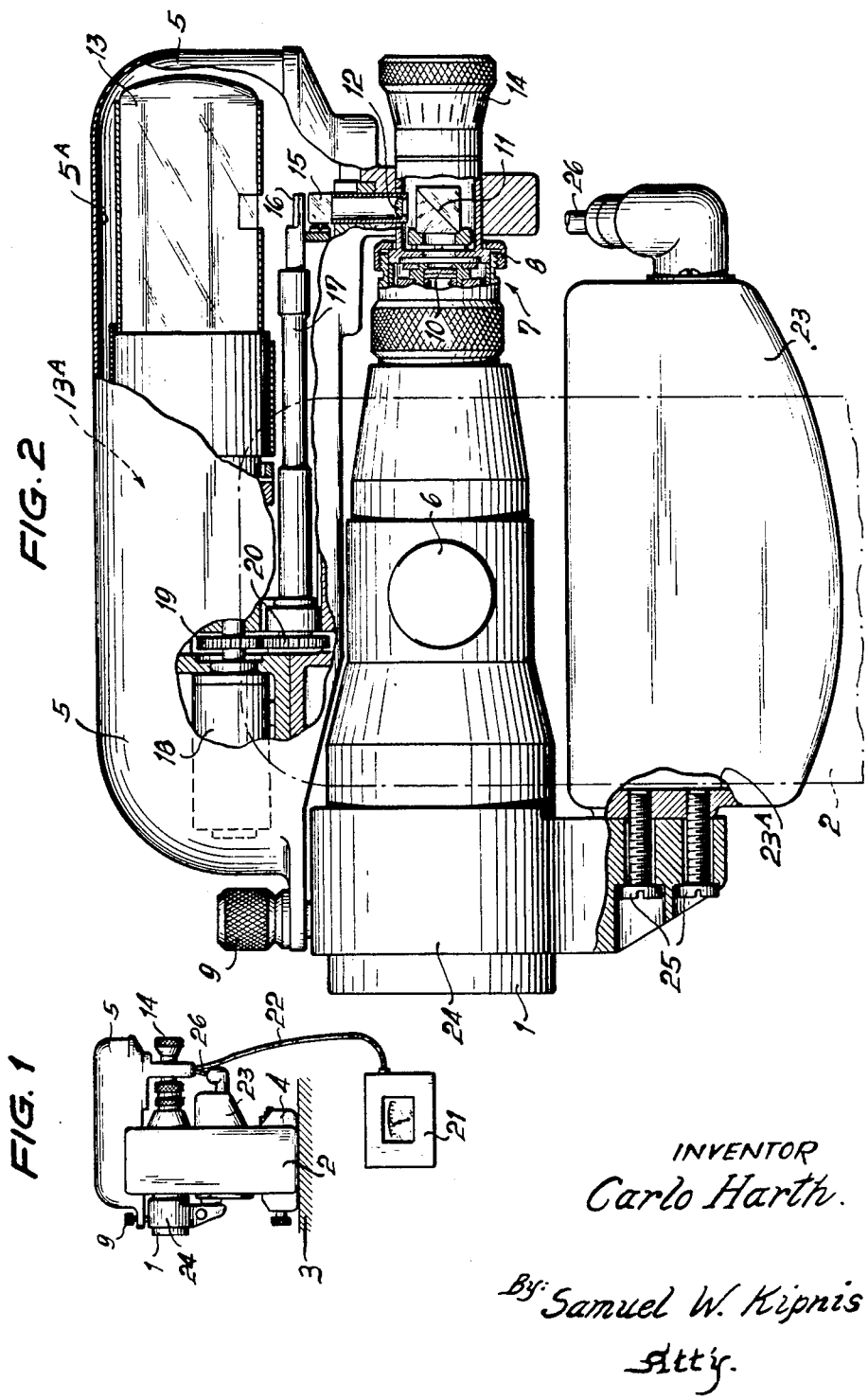

3,002,417
AUTOMATIC TARGET FINDER AND TRACKER
FOR THEODOLITES AND THE LIKE
Carlo Harth, Berlin-Steglitz, Germany, assignor to Askania-Werke A.G., Berlin-Friedenau, Germany, a corporation of Germany
Filed Oct. 2, 1958, Ser. No. 764,934
Claims priority, application Germany Oct. 26, 1957
4 Claims. (Cl. 88—1)

This invention relates to the mounting and the distribution in space of instrument components forming parts of target-finding and/or tracking theodolites and the like.

Photo-electrical components are important parts of such instruments and hitherto have generally been installed as extensions of the telescope. The resulting length of the instrument as well as the added weight has been of small concern where large observatories or the like were available but has otherwise caused distinct trouble. Portable instruments became more cumbersome; and in the use of the instruments, one-sided turning moments were encountered, or, when they were counteracted, desirable mobility was impaired. In many cases it became impossible to tilt the telescope through the full extent of the altitude circle or at any rate to turn it as rapidly and as accurately as is desired.

Remedial attempts have been numerous and one of the most important was based on the proposition that the telescope be rigidly combined only with such elements of the photo-electrical system as are directly dependent on utilisation of the optical image, that is, with the photocell or equivalent component and with such components as are required between the cell and the telescope optics. This, however, has resulted in further difficulties, aside from the fact that the fundamental problem has not been completely solved thereby. Connections between photosensitive tubes and amplifiers became long; signal transmission through such long connections became erratic; and power supply particularly to the high-voltage elements became dangerous. While various forms of shielding and protection of cables were available these again interfered with desired mobility.

Additional problems could be mentioned; for instance, in many of the instruments it was inconvenient to combine human observation with the automatic target-finding or tracking as it was necessary to employ lateral ocular systems, which are not ideal for rapid target finding, or to switch from oculars to phototubes and back to oculars by somewhat massive mechanisms, which are far from being ideal for precision work. However, the foregoing remarks will indicate the types of problems most frequently encountered.

It has now been found that such and other problems can be eliminated by a novel distribution in space of certain major groups of instrument components. More particularly, the new instrument uses a broken optical axis leading from telescope sight to phototube aperture; and correspondingly, a phototube unit or subassembly is mounted or incorporated as a body parallel to the telescope; not longitudinally behind the same. Desirably there is also provided a power supply unit mounted or incorporated in a similar way, so that the instrument comprises, aside from supports and angular motion controls, a rigid unit structure wherein three elongated, parallel members—phototube member, telescope member and power supply member—are disposed above one another, with the telescope and the axis thereof in central position. By means of this arrangement the instrument has regained desirable portability, mobility in use, precision of operation and safety of electrical supply, along with other required features or advantages, as will readily be noted from the detailed disclosure which follows.

In the drawing, FIGURE 1 is a side view of a theodolite incorporating the present invention and FIGURE 2 is a similar view, on a larger scale, of the new unit structure.

The illustration shows a theodolite wherein automatic tracking or finding of a target is required only in a single plane and wherein the phototube structure and the power supply structure are removably secured to the telescope. The invention is not limited to such arrangements but it can be most readily explained in connection therewith.

Telescope 1, which may be of any desired refractor or reflector type, is shown as being supported by frame 2, which in turn rests on table 3 with control housing 4 for the usual horizontal circle and reading means. The usual altitude circle and reading means is disposed in frame 2; these elements need not be shown herein. According to the invention an elongated phototube housing 5 is rigidly secured to telescope 1, this housing being disposed above the telescope and being approximately as long as the telescope, parallel therewith and only slightly spaced from the axis thereof. At any more or less remote point a battery and indicator unit 21 may be positioned, which is connected with unit structure 1, 5 only by a thin and flexible low-voltage power cable 22, leading to the phototube unit both directly and also through a power supply member 23; the latter member being desirably arranged in a way similar to the mounting of unit 5 but below the telescope. Thus a phototube, telescope and power supply structure 5, 1, 23 is formed, which is narrow in horizontal extension, wider in vertical extension, and desirably short and compact in horizontal length.

Horizontal axis or trunnion structure 6 of telescope 1 can thus be arranged in the approximate geometrical center of structure 5, 1, 23 and in the precise center of gravity thereof and can be pivoted in frame 2 by desirably mobile, low-friction bearings (not shown). Phototube housing 5 is shown as being joined to the ocular end portion 7 of telescope 1 by a screw-threaded connector 8 and as being additionally supported, for greater stability, on the objective end of the telescope by screw 9.

Photo-electrical unit 5 is shown as using a photo-electron emission tube of the secondary electron multiplier type, but the unit can use photosensitive elements, and accessory parts, of various types. With respect to accessories of the tube, it is known for instance to analyze a real image or an object by a flying spot scanner or with the aid of a revolving scanning shutter, in which cases automatic tracking can be achieved for instance by constantly measuring light flux intensities and by deriving a response from uniformity of such intensity throughout a scanning cycle. It is also a known expedient, per se, to split the telescope image into two portions, to compare the light flux intensities of such portions, and to derive responses from positive, negative or zero differences between such measured intensities. This latter system is used in the present instrument as shown, wherein object images, available at telescope reticle plate 10, are brought along the telescope sight axis to an interference mirror 11 for reflection into an optical system 12 the axis of which is at right angles to that of the telescope; the elements 11, 12 being parts of unit 5. Multiplier 13 has a light aperture opposite optical system 12, and as this aperture is formed on the side of the multiplier as shown, the multiplier structure, socket, etc., extend parallel with telescope 1.

In order to allow human observation along with the multiplier operation, unit 5 has an aperture at the far end of the telescope sight axis, where a suitable ocular 14 is provided, adjacent interference mirror 11. Desirably, interference mirror 11 is so constructed as to reflect radiations of the type most adapted to photo-electrical use, for instance in the blue, violet and ultra-violet band, whereas ocular 14 can then operate, without undue loss of observable light intensity, in the yellow and red band. At the same time the use of movable reflectors and the like, and the resulting vibration and loss of precision, is avoided in this way.

Between system 12 and multiplier 13 the reflected light passes an image splitting element 15, such as a prism which presents a precision-ground edge to the light stream, the orientation of the edge or splitting line being chosen at right angles to the tracking motion to be derived from the split image. The two light streams separated by the prism are alternately stopped by revolving shutter 16, which preferably has an axis transverse to the light beams and accordingly parallel to telescope 1, and opaque surfaces extending radially of such axis and at an angle to one another, so as to cyclically stop, first one, then both, and then the other of the light beams formed by the prism. The use of this type of shutter has a number of advantages, for instance it allows the use of very slight spacing between the separated light streams, thereby contributing greatly to electronic accuracy as well as to the space economy which is of particular importance to the present invention.

The shaft 17 of shutter 16 is pivoted in phototube unit 5 by suitable structures, not shown, and is driven by electrical motor 18 via gear drive 19, 20 in unit 5. Said unit also contains, desirably, an amplifier stage at position 13A in order to minimize the use of relatively long transmission lines which have to carry signals either of high frequency or of critical waveshape. The output of this amplifier stage is fed via cable 22 to measuring instrument 21 (FIGURE 1), where a basically known circuit, not shown, compares amplitude values of signals which the tube 13 has derived from the two light streams. When the remote, radiation emitting or reflecting target is accurately focussed on, the image thereof is centered on reticle 10, the light streams to and electrical signals from the photosensitive unit 5 have equal intensity and amplitude, and indicating instrument 21 shows zero condition. Absence and loss of such focussing is also shown, and suitable response thereto can be derived by sensing means and servo-motors, not shown. Either by such response or by manual operation, tracking of a moving target from a fixed or moving position, or of a fixed target from a moving position, can be achieved; and the resulting motions of the telescope are facilitated by the balanced and compact construction of unit structure 1, 5, or 1, 5, 23.

Element 23 of this unit structure is preferably added to elements 1 and 5, as part of the central, moving structure, and is desirably secured to an annular clamp 24 forming part of element 5 and surrounding the objective end of telescope 1. The separation in space of elements 5 and 23 has several advantages. In the first place, disturbances of signals of weak strength, by electromagnetic influence and the like, for instance from transformers in the power supply structure, are minimized by the thorough shielding inherent in the use of separate element housings 5A, 23A. Additionally, where high voltages are required for operation of the photoelectric unit, as is known to be the case with multipliers, the required, relatively inflexible encapsulation of conductors is necessary only for a short cable 22A which can be rigid with units 23 and 5, so that the basic supply cable 22 can be thin and flexible, and substantially no obstruction is offered to the motion of the unit structure 5, 1, 23.

It will be understood that, instead of automatic analysis in single plane, such analysis can be provided in two planes by suitable modification of the optics of the photosensitive unit 5, and that many other changes are possible, all this within the scope of the following claims.

I claim:

1. In a target seeking instrument, a support structure and a telescope and phototube unit movably suspended thereon, said unit comprising a telescope including objective means for forming an image of a remote object, housing means lateral of and adjacent to the axis of said objective means, ocular means in axial alignment with said objective means, means between said ocular means and objective means for transferring an image formed by the objective means perpendicular to the axis of the telescope and into the housing means interposed between said ocular means and the objective means, photoelectrical means in said housing for deriving electrical signals from the transferred image, and signal responsive tracking means in electrical connection with the photoelectrical means.

2. In an instrument as described in claim 1, the feature that said housing contains voltage step-up transformer means and that the electrical connection contains only low-voltage conductors.

3. In a theodolite, a frame movable about a vertical axis, a telescope and electric-eye unit suspended in said frame for free and easy motion about a horizontal axis, said unit comprising, telescope tube means, housing means for photo-electrical apparatus, said several means being rigid with one another and being arranged above one another and adjacent to one another, objective means in said telescope tube means for forming an image of a remote object, ocular means on said housing in line with said objective means, image transferring means in said housing interposed between the ocular means and the objective means for reflecting an image formed by the objective means perpendicular to the axis of the telescope tube means and into said housing, a beam splitter in said housing interposed in the path of the transferred image, photo sensitive means in said housing for deriving electrical signals from the reflected image, and signal responsive means remote from the unit and electrically connected with said photo sensitive means.

4. A target finder instrument for attachment to a theodolite tube, comprising a housing structure, means for securing said structure coaxially to the open ocular end of said tube and for holding the structure in a position laterally of the tube and adjacent the same, ocular means on said structure in axial alignment with and at the open ocular end of said tube, image transferring means in said structure for directing light entering through the ocular means into a lateral direction and into the housing structure, and light flux intensity analyzing means including photo electrical means in said structure for analyzing the so directed light.

References Cited in the file of this patent
UNITED STATES PATENTS

| | | |
|---|---|---|
| 2,513,367 | Scott | July 4, 1950 |
| 2,917,967 | Steglich | Dec. 22, 1959 |
| 2,941,082 | Carbonara et al. | June 14, 1960 |

FOREIGN PATENTS

| | | |
|---|---|---|
| 799,392 | France | Apr. 4, 1936 |